US009761083B2

(12) United States Patent
Yacenda

(10) Patent No.: US 9,761,083 B2
(45) Date of Patent: Sep. 12, 2017

(54) LOCATION, AGE AND IDENTITY VERIFICATION FOR MOBILE GAMING

(71) Applicant: ELOTTERY, INC., Stamford, CT (US)

(72) Inventor: Michael W. Yacenda, Stamford, CT (US)

(73) Assignee: ELOTTERY, INC., Stamford, CT (US)

( * ) Notice: Subject to any disclaimer, the term of this patent is extended or adjusted under 35 U.S.C. 154(b) by 84 days.

(21) Appl. No.: 14/470,174

(22) Filed: Aug. 27, 2014

(65) Prior Publication Data

US 2014/0370959 A1 Dec. 18, 2014

Related U.S. Application Data

(63) Continuation-in-part of application No. 13/234,910, filed on Sep. 16, 2011, now Pat. No. 8,834,251.

(51) Int. Cl.

| | |
|---|---|
| ***A63F 13/70*** | (2014.01) |
| ***G07F 17/32*** | (2006.01) |
| ***A63F 3/06*** | (2006.01) |

(52) U.S. Cl.

CPC ........ *G07F 17/3241* (2013.01); *A63F 3/0605* (2013.01); *G07F 17/3225* (2013.01); *G07F 17/3237* (2013.01); *G07F 17/3258* (2013.01); *G07F 17/329* (2013.01)

(58) Field of Classification Search

CPC .................................................. G07F 17/3241
USPC ................................................ 463/25, 40–42
See application file for complete search history.

(56) References Cited

U.S. PATENT DOCUMENTS

| | | | | |
|---|---|---|---|---|
| 5,802,199 | A | 9/1998 | Pare, Jr. et al. | |
| 6,363,485 | B1 | 3/2002 | Adams et al. | |
| 6,709,333 | B1 | 3/2004 | Bradford et al. | |
| 7,828,652 | B2 | 11/2010 | Nguyen et al. | |
| 8,499,164 | B2 | 7/2013 | Ortiz et al. | |
| 2001/0036853 | A1 | 11/2001 | Thomas | |
| 2002/0094869 | A1 * | 7/2002 | Harkham ................ | G07F 17/32 463/42 |
| 2004/0248589 | A1 | 12/2004 | Gwon et al. | |
| 2008/0167060 | A1 | 7/2008 | Moshir et al. | |

(Continued)

FOREIGN PATENT DOCUMENTS

WO WO 2007/008714 1/2007

OTHER PUBLICATIONS

International Search Report Dated Feb. 15, 2013.

*Primary Examiner* — David L Lewis
*Assistant Examiner* — Ross Williams
(74) *Attorney, Agent, or Firm* — F. Chau & Associates, LLC

(57) ABSTRACT

A method for mobile game play includes determining a location of a mobile device from one or more of GPS, NFC, RFID, or Bluetooth. An accuracy value of the location of the mobile device is determined. A region of confidence within which the mobile device is known to be within is determined based on the determined accuracy value. The region of confidence is substantially circular with a center at the determined location and a radius that is proportional in length to the determined accuracy value. An extent to which the region of confidence is within one or more pertinent jurisdictions is determined. Mobile game play is permitted when it is determined that the region of confidence is entirely within the one or more pertinent jurisdictions.

10 Claims, 11 Drawing Sheets

(56) References Cited

U.S. PATENT DOCUMENTS

| | | | | |
|---|---|---|---|---|
| 2008/0194311 | A1* | 8/2008 | Cage | G06Q 40/00 463/17 |
| 2009/0042633 | A1 | 2/2009 | Yacenda | |
| 2009/0088180 | A1 | 4/2009 | LaMance et al. | |
| 2009/0088240 | A1* | 4/2009 | Saunders | G06F 7/58 463/22 |
| 2010/0109864 | A1 | 5/2010 | Haartsen et al. | |
| 2010/0120449 | A1 | 5/2010 | Jakorinne et al. | |
| 2011/0070834 | A1 | 3/2011 | Griffin et al. | |
| 2011/0102259 | A1 | 5/2011 | Ledvina et al. | |
| 2011/0269529 | A1* | 11/2011 | Baerlocher | G07F 17/32 463/25 |

* cited by examiner

LOCATION, AGE AND IDENTITY VERIFICATION FOR MOBILE GAMING

CROSS-REFERENCE TO RELATED APPLICATION

The present application is a Continuation-in-Part of U.S. patent application Ser. No. 13/234,910, filed Sep. 16, 2011, the entire contents of which are herein incorporated by reference.

BACKGROUND OF THE INVENTION

1. Technical Field

The present disclosure relates to mobile gaming and, more specifically, to location, age, and identity verification for mobile gaming.

2. Discussion of Related Art

While there are many variations, the basic lottery is a game of chance in which a player selects or is selected a set of numbers. A drawing is then performed to determine a set of winning numbers. Those players who had selected the winning numbers may be awarded a sum of money. Today, lottery games are often state run or administered on behalf of a state, although casinos and other private entities may administer lottery games where local laws permit.

Traditionally, the player would receive a paper ticket at the time of entry into the lottery game. The ticket would contain the numbers that the player selected or were otherwise assigned to the player. Because entry into the lottery would require the physical presence of the player to purchase the ticket, the age of the player could be verified at the point of sale, for example, by a clerk responsible for dispensing the lottery ticket. By verifying age, restrictions associated with lottery play may be adhered to.

In addition to verification of age, it is often important that the sale of the lottery ticket be performed within a particular jurisdiction. For example, where a lottery is administered by or on behalf of a state, the sale of the lottery tickets might have to be limited to the territory of that state. Under the traditional approach for lottery game entry that is performed in-person, a state need only ensure that their authorized points of sale are physically located within the jurisdiction of the state. Verification of the physical location of the player at the moment of entry is not a practical concern.

Lotteries need not be confined to a single jurisdiction. Today, multi-jurisdiction lottery games such as POWERBALL and MEGA MILLIONS are available in which multiple jurisdictions within the United States participate in combined sweepstakes. In such games, the location where the player purchases the lottery ticket with in the set of combined jurisdictions may affect how revenue generated from the sale of the ticket is shared among the participating jurisdictions.

Currently, entry into lottery sweepstakes is generally limited to in-person transactions in which paper tickets are purchased. Lottery play may be performed over electronic lines of communication such as the Internet. As mobile communications devices such as mobile phones and Internet-enabled tablets proliferate, the possibility exists to engage in lottery play from a mobile device.

SUMMARY

A method for mobile game play includes determining a location of a mobile device from one or more of Global Positioning System (GPS), Near Field Communication (NFC), Radio-Frequency Identification (RFID), or Bluetooth Low-Energy (BLE). An accuracy value of the location of the mobile device is determined. A region of confidence within which the mobile device is known to be within is determined based on the determined accuracy value. The region of confidence is substantially circular with a center at the determined location and a radius that is proportional in length to the determined accuracy value. An extent to which the region of confidence is within one or more pertinent jurisdictions is determined. Mobile game play is permitted when it is determined that the region of confidence is entirely within the one or more pertinent jurisdictions.

The mobile game play may include lottery, card games, or instant win games. The mobile game play may include wagering on a sporting event.

The method may further include receiving a user selection of a sporting event to wager upon on the mobile device. A wager on the selected sporting event may be accepted from the user on the mobile device. Display of the selected sporting event, in real-time, may be initiated on a television using the mobile device. The selected sporting event may be displayed on the television via a set-top-box configured to stream video on the command of the mobile device.

The mobile game play may include keno. A keno wager may be accepted from the user on the mobile device and display of a keno drawing, in real-time, may be initiated on a television using the mobile device. The selected sporting event may be displayed on the television via a set-top-box configured to stream video on the command of the mobile device.

Location may be determined based on proximity between multiple mobile devices. Proximity between multiple mobile devices may be measured using WiFi or Bluetooth communication protocols. Proximity between multiple mobile devices may be measured using NFC.

A method for mobile game play includes initiating a game play application on a mobile device. A validation request is received from the game play application at a validation server. The validation request includes player login credentials. A query is sent, in response to the receiving of the validation request, from the validation server to an administration server to determine game play eligibility of the player. The query includes an age and present location of the player. A secure transaction key authorizing the player to initiate a mobile gaming session is received from the administration server when the player's age and present location satisfies predetermined criteria. The received secure transaction key is sent to a casino link serve. Mobile game play of a casino game is initiated through the mobile device via the casino link server upon receiving the secure transaction key.

The secure transaction key may include one or more restrictions on mobile game play and the casino link server may enforce the one or more restrictions.

The query sent from the validation server to the administration server may further include a name of the player, and the administration server may maintain a database of who has been authorized to participate in mobile gaming.

The administration server may maintain a blacklist of players who are not eligible to engage in mobile gaming and the secure transaction key may be issued only for players not on the blacklist.

Player account information may be maintained by the validation server.

The mobile device may be a smartphone.

The administration server may be maintained by a governmental agency.

A method for mobile gaming includes interfacing a smartphone, having a game play application installed thereon, to an in-dash display unit installed within a vehicle. A location of the smartphone is monitored. It is determined when the vehicle enters into a jurisdiction participating in mobile gaming based on the monitoring of the location of the smartphone. An alert is generated when it is determined that the vehicle has entered into the jurisdiction participating in mobile gaming. The generated alert is displayed on the in-dash display unit.

The method may additionally include displaying a menu option to participate in mobile gaming with the jurisdiction participating in mobile gaming and providing mobile game play with the jurisdiction participating in mobile gaming when the menu option is selected.

Monitoring the location of the smartphone may be performed using a GPS module incorporated into the smartphone.

The interfacing of the smartphone to the in-dash display unit may be performed using a Bluetooth connection.

The alert may be generated when it is determined that a jackpot of a game offered by the jurisdiction participating in mobile gaming exceeds a predetermined threshold.

The generated alert may include an amount of a jackpot of a game offered by the jurisdiction participating in mobile gaming and the amount of the jackpot may be displayed on the in-dash display unit.

The mobile gaming may include a lottery game.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
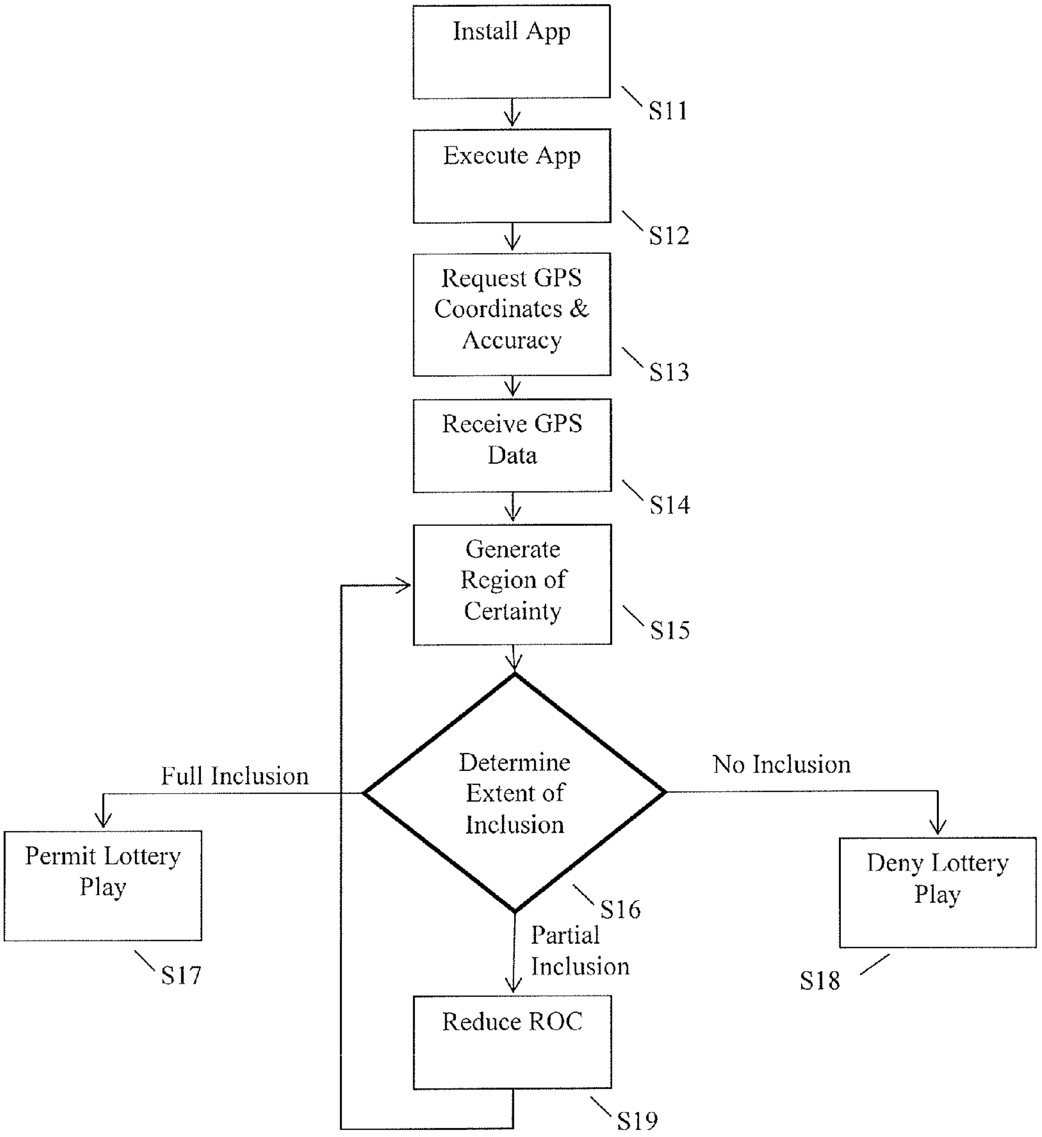
FIG. 1 is a flow chart illustrating an approach for mobile lottery play according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and methods for conducting online gaming, for example, lottery play using a mobile device such as a mobile phone or portable computer as a player terminal. Although no physical ticket need be generated, the entry into the lottery sweepstakes or other game by the player may be colloquially referred to herein as the purchase of a ticket, for example, a lottery ticket. As the mobile device used by the player to purchase the lottery ticket may be operated in a variety of different locations, exemplary embodiments of the present invention seek to identify the location of the player at the moment of the ticket purchase consummation and/or some other relevant moment. This location may then be used either to permit or prevent the player from purchasing the lottery ticket and thereby participating in the lottery sweepstakes, or this location may be used to assign revenues or other interests between jurisdictions in a multi-jurisdictional lottery game.

Exemplary embodiments of the present invention may also be used to verify the age of a player who engages in mobile lottery play. By verifying the age of the player, mobile lottery operators may ensure proper compliance with statutes and regulations that restrict the sale of lottery tickets to players over a predetermined age, which may be, for example, 18 or 21 years of age. This may be accomplished by either establishing that the player is in fact a pre-registered player whose age is already known or by taking steps to determine the age of the player by remote examination of documents/identification and/or by biometric analysis.

Where the player is preregistered, exemplary embodiments of the present invention may focus on how to validate the player's identity to ensure that participation in the online lottery is authorized.

A mobile device may refer herein to a portable electronic communication device such as a mobile telephone, a feature phone, a smart phone, a personal digital assistant (PDA), a tablet computer, a laptop computer, an automobile in-dash console, set-top box or any other transportable digital computer or digital appliance. The mobile device may include one or more means of communication such as a modem, for transmitting data over a cellular telephone network, personal communications system network, WiFi, mobile WiMAX, satellite communications network, etc. The mobile device may also include a satellite-based navigation system such as a GPS unit, a GLONASS unit, or a Galileo unit. The mobile device may also include a near field communication (NFC) unit and/or a Radio-frequency Identification (RFID) unit. The mobile device may also include other local area network capabilities such as BLUETOOTH.

The mobile device may also include various components that may be used reading documents and/or performing biometric analysis. Such components may include, for example, a still and/or video camera that may be used to capture a photograph of a document, ID card, a barcode, and/or an image of a player's face, retina, fingerprint, or any other biometric indicator. Such components may also include an RFID tag reader, a magnetic strip reader, and/or a near-field communication (NFC) tag reader for reading data encoded on an identification card or document. Such components may also include a fingerprint scanner and/or a microphone for receiving a sample of the player's voice so that voice recognition may be performed. Such components may also include a digitizer, which may be embodied as a touch-sensitive screen, upon which a user may provide a signature or other handwriting sample that may be used to authenticate the player's identity.

It is additionally conceivable that other biometric identification devices may be included in the mobile device, such as a device that can analyze DNA, as the cost of such devices falls to a point where incorporation into a mobile device is incorporation into a mobile device is practical.

The use of wearable biometric sensors is becoming more widespread. For example, wearable health products such as FITBIT, sold by Fitbit Inc., and NIKE+FULEBAND, sold by Nike Inc. These devices, as well as other wearable devices, may be able to determine various vital signs that may be used to create a player signature that may be used to help authenticate the identity of the wearer.

Exemplary embodiments of the present invention may be executed as native software running on the mobile device, as software running on a server accessible by the mobile device, or a combination thereof. Where execution is in the form of native software running on the mobile device, the software may be embodied as an application installed on the mobile device. Where execution is in the form of software running on a server, the server may be accessed via a web browser running on the mobile device, or through a custom application installed on the mobile device. The software application may be installed on the mobile device by means known in the art such as direct installation or download from an application store or marketplace provided for the mobile device.

In either case, the software may provide for a user interface by which a player can establish a player account, verify the player's age and/or location, purchase a lottery ticket, manage lottery tickets already purchased, redeem lottery awards, and perform other transactions associated with lottery play. The software may also provide means of allowing a player to select lottery numbers or generate pseudorandom numbers for lottery play.

As indicated above, the software application may provide the ability to identify the age and/or location of the mobile device at the moment in which the purchase of the lottery ticket is consummated or at some other pertinent moment, such as at player account enrollment. The pertinent moment, for the purposes of verifying geographic location, may be predetermined and may be, for example, the moment the request for the purchase of a lottery ticket is initiated by a user, the moment the request for the purchase of a lottery ticket is completed, the moment a serial number is generated for the purchased lottery ticket, etc. Alternatively, location check may be performed at multiple pertinent moments throughout the lottery ticket purchasing process or may be performed continuously throughout the lottery ticket purchasing process.

Age verification need only be performed once, for example, when the player creates a player's account. Thereafter, age verification may be performed by verifying that the person engaged in lottery play is actually the same person that age has already been verified for. Alternatively, age may be verified at the time of play.

The software application may identify the location of the mobile device by analyzing output of various sensors and radios available to the mobile device. For example, the software application may receive data from a GPS module within the mobile device. This data may include, inter alia, position coordinates such as latitude and longitude as well as a measure of location accuracy and/or one or more regions of certainty. A region of certainty (ROC) is a range of coordinates within which the software application is reasonably certain to be within. The radius of the region of certainty may be dependent upon the confidence/accuracy with which the GPS unit is able to determine a position. For example, where the GPS unit is able to determine a location with a high degree of confidence/accuracy, the region of certainty may be relatively small, for example, as small as a few feet. However, where the GPS unit is only able to determine a location with a low degree of confidence/accuracy, for example, if a strong satellite lock cannot be established, the region of certainty may be relatively large, for example, on the order of hundreds of feet.

According to one exemplary embodiment of the present invention, the degree of confidence/accuracy is directly proportional to a number of satellite locks acquired during GPS location.

The region of certainty may also have an associated percentage value that represents the likelihood that the mobile device is within the region of certainty given its radius. This percentage may be predetermined based on the desired level of accuracy. For example, this percentage may be set to 90%, 95%, 99%, 99.9%, etc., as desired. This percentage may accordingly be inversely related to the length of the radius of the region of certainty. For example, the higher the percentage is set to, the larger the radius would be, given a fixed quality of GPS signal. Accordingly, an example of a determined set of coordinates may be (40.828202,-73.459945). However, the software application may additionally compute a region of certainty about this point such as a 99% certainty that the mobile device is within a radius of 0.005 of the coordinates (40.828202,-73.459945) and in this way, the region of certainty may be defined. However, the radius of the region of certainty need not be measured in latitude and longitude coordinates, as provided for the purposes of example, the radius may be defined in terms of linear measurement such as feet or meters.

Exemplary embodiments of the present invention may receive, for example, from a state or multi jurisdictional lottery commission, an acceptable percentage of certainty. For example, a state lottery commission may require 99.9% certainty that the player terminal be located within the appropriate jurisdiction when the lottery ticket is purchased. Accordingly, exemplary embodiments of the present invention may utilize information pertaining to the GPS unit's quality of signal lock to determine a radius about which the mobile device is 99.9% likely to be within.

The determined coordinates and the calculated radius may then be compared against a table or equation of jurisdictional boundaries to determine whether the entirety of the region of certainty is within the proper jurisdiction. If the entirety of the region of certainty is determined to be within the jurisdiction within which a lottery ticket may be sold, then the purchase of the lottery ticket though the mobile device may be allowed. Alternatively, if any portion of the region of certainty is determined to be beyond the proper jurisdiction, the transaction may be disallowed or canceled.

In this event, alternative means of location verification may be employed to permit the transaction.

It should be noted, however, that where part of the region of certainty is located within a body of water, either it may be assumed that all such bodies of water are with the proper jurisdiction or exemplary embodiments of the present invention may delineate between jurisdictional waters of multiple jurisdictions. In either case, however, non-jurisdictional waters, international waters, and waters that are otherwise considered beyond the jurisdiction of any particular state may be assumed to be with the proper jurisdiction for these purposes.

Alternative means of location verification may be employed, for example, where a portion of the region of certainty is determined to be within the proper jurisdiction while another portion of the region of certainty is determined to be beyond the proper jurisdiction, as this scenario may be indicative of lack of suitable insight into location. Alternative means of location may also be employed in place of the primary means of location identification described above.

Additionally, when lack of suitable insight into location is observed, the player may be instructed by the software application in ways to improve satellite accuracy which could then be used to shrink the region of certainty and allow the transaction to be completed. Such instructions may include, for example, informing the player to step outside of any structures and/or away from any tall objects which might obstruct satellite reception.

Alternative means of location may include, for example, a Near Field Communication (NFC) check-in. According to this approach, one or more NFC tags may be positioned at various known locations such as at convenience stores, gas stations and the like. A player may then be able to authenticate location within a particular jurisdiction by positioning the mobile device within close range of the NFC tag and thereby read location information from the NFC tag, which may be preprogrammed with location information for the location in which it is installed. The location information preprogrammed into the NFC tag may be encrypted to protect against tampering and to ensure reliability. Alternatively, the NFC tag may be preprogrammed with jurisdiction information identifying the jurisdiction within which the NFC tag is installed. This information may also be encrypted for security.

The NFC tag may also include other information such as vender identification data that may be used by the software application to appropriately credit the vender where the NFC tag is installed for the sale of the lottery ticket.

Other means of location identification may be used in addition to or in place of the methods described above. While these other means of location identification may be less accurate than, for example, GPS, use of one or more of these approaches may allow for a reduction of the radius of the region of certainty and in certain marginal cases, this reduction of the region of certainty may be the difference between being able to authenticate the player in the correct jurisdiction and allowing the ticket purchase to proceed and not being able to authenticate the player in the correct jurisdiction.

These other means of location identification may include, for example, geographic triangulation based on known positions and signal strengths of cellular telephone towers, FM radio broadcast towers, television broadcast towers, WiFi hotspots, etc. Known examples of this technique include assisted GPS (A-GPS), WiFi positioning systems, cell-site triangulation, and hybrid positioning systems.

FIG. 1 is a flow chart illustrating an approach for mobile lottery play according to an exemplary embodiment of the present invention. First a player may install an application for conducting mobile lottery play on a mobile device (Step S11). Installation of the application may be performed, for example, through an application store or market place established for the class of mobile device being used. Alternatively, the software application may be installed by downloading an executable file from a website, from an attachment to an email, or other known means for software installation. As an alternative to installing the application for conducting mobile lottery play on the mobile device, the player may access a website for mobile lottery play using a mobile web browser running on the mobile device.

After the application has been installed, the player may initiate execution of the application (Step S12). During execution of the application, the player may be guided through the steps of purchasing a lottery ticket or otherwise participating in a game of chance. The application may then request GPS position information and accuracy data from a GPS unit of the mobile device (Step S13). The application may then receive both the position information and the confidence data from the GPS unit (S14). The position information may include, for example, latitude and longitude coordinates. The confidence data may include information that helps establish a degree of confidence in the accuracy of the received position information, for example, a number of satellite locks, signal strength for each satellite signal received, average satellite signal strength, an error count for each satellite signal received, etc.

The received position information and confidence data may then be used together to generate a region of certainty that the player terminal can be understood to be within with a predetermined percentage of certainty (Step S15). As described above, the percentage of certainty may be predetermined, for example, based on state lottery administration criteria and may be, for example, 95%, 99%, 99.9%, etc.

Next it may be determined to what extent the region of certainty is included within a pertinent jurisdiction (Step S16). Where the region of certainty is determined to be entirely within the pertinent jurisdiction (full inclusion) then the purchase of the lottery ticket by the player may be permitted (Step S17). Where the region of certainty is determined to be entirely beyond the pertinent jurisdiction (no inclusion) then the purchase of the lottery ticket by the player may be denied (Step S18).

However, where the region of certainty is not entirely within the pertinent jurisdiction and the region of certainty is not entirely beyond the pertinent jurisdiction (Partial Inclusion) then alternative location strategies may be employed to collect additional data with which to calculate the region of certainty so that the radius of the region of certainty may be reduced (Step S19). Several examples of these techniques are discussed above in detail; however, the invention should not be understood to be limited to the examples discussed above.

After the additional data is collected to reduce the region of certainty (Step S19), the region of certainty may be recalculated at Step S15 and the check of the extent of inclusion (Step S16) may be performed again.

Reduction of the region of certainty may also include the presentation of a set of instructions to the player for improving GPS satellite reception and thereafter, the application may re-request GPS position information (Step S13).

In either event, it is to be understood that only a limited number of attempts to define the mobile device as either entirely within or entirely beyond the pertinent jurisdiction might be performed and thereafter, the ticket purchase may be denied or postponed.

The above-described approach pertains to locating the mobile device within a particular jurisdiction for the purposes of allowing or disallowing the purchase of a lottery ticket however, exemplary embodiments of the present invention may also locate the mobile device within a particular jurisdiction for the purposes of determining which jurisdiction is to receive royalties associated with a mobile sale of a multi jurisdictional lottery ticket. In such a case, where the region of certainty is entirely within a first participating jurisdiction, credit for the lottery ticket transaction may be assigned to the first participating jurisdiction. Where the region of certainty is entirely within a second participating jurisdiction, credit for the lottery ticket transaction may be assigned to the second participating jurisdiction. Where the region of certainty is entirely beyond any participating jurisdiction, the sale of the lottery ticket may be denied as described above or one or more of the approaches discussed above may be employed to narrow the region of certainty to be fully within a particular jurisdiction.

However, where the region of certainty spans a first participating jurisdiction and a second participating jurisdiction, for example, even after all attempts have been made to narrow the radius of the region of certainty, the lottery ticket transaction may be allowed and credit for the lottery ticket transaction may be split between the first and second participating jurisdiction, for example, in accordance with the degree to which the region of certainty spans each participating jurisdiction or more simply on a half-and-half split. Thus, according to the first approach, if the region of certainty is 80% within the first participating jurisdiction and 20% within the second participating jurisdiction, the first participating jurisdiction may be assigned 80% of the credit for the sale of the lottery ticket and the second participating jurisdiction may be assigned 20% of the credit for the sale of the lottery ticket. According to the second approach, if the region of certainty is 80% within the first participating jurisdiction and 20% within the second participating jurisdiction, each participating jurisdiction may be assigned 50% of the credit for the sale of the lottery ticket.

According to a third all-or-nothing approach, credit for the sale of the lottery ticket may be fully attributed to the participating jurisdiction within which the majority (or plurality where the region of certainty extends into three or more jurisdictions) of the region of certainty is within.

Alternatively, the player may be asked what jurisdiction he is located within or credit may be assigned according to player's residence rather than player's location. It should be noted, however, that such a case may still require that the entire region of certainty be within one or more participating jurisdictions to ensure that the player is indeed within a participating jurisdiction, even if the particular participating jurisdiction cannot be sufficiently resolved.

It may also be that at least part of the region of certainty falls within a region of exceptional jurisdiction. A region of exceptional jurisdiction may be a region in which jurisdiction is not well defined or otherwise complex in nature. Examples of exceptional jurisdiction may include international or interstate waters, American Indian reservations, diplomatic missions, etc. When at least part of the region of certainty falls within a region of exceptional jurisdiction, a rules database may be consulted to determine whether lottery play may be allowed.

As discussed above, the moment in which player location is determined may have a bearing on whether a player is permitted to purchase a lottery ticket over the mobile device. As described above, this pertinent moment in which location is checked may be at the start of the ticket purchase transaction, the conclusion of the ticket purchase transaction, at multiple points or continuously therebetween. However, the pertinent moment may be set, for example, immediately prior to the issuance of a lottery ticket serial number.

Figure 2:
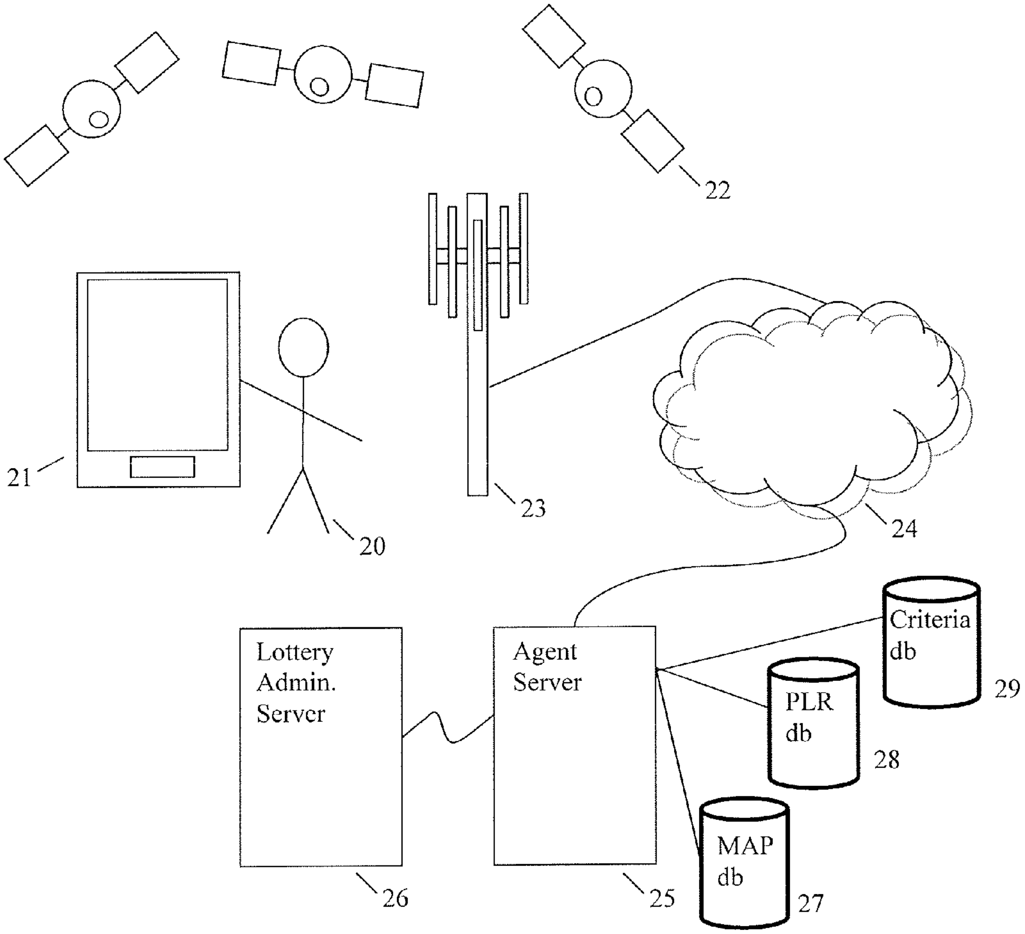
FIG. 2 is a diagram illustrating a system for the sale of mobile lottery tickets according to an exemplary embodiment of the present invention.

FIG. 2 is a diagram illustrating a system for the sale of mobile lottery tickets according to an exemplary embodiment of the present invention. A player 20 may be in personal possession of a mobile terminal 21. The mobile terminal may communicate with a wireless network via one or more base stations 23. The wireless network may provide the mobile terminal 21 with access to the Internet 24 or another computer network. The wireless terminal 21 may communicate with an agent server 25 via the Internet 24. The wireless terminal 21 may be able to determine its location coordinates along with a measure of accuracy by communication received from a constellation of satellites 22. The mobile terminal 21 may transmit its location coordinates to the agent server 25. The mobile terminal 21 may also transmit the measure of accuracy to the agent server 25 where a region of certainty may be computed. Alternatively, the mobile terminal 21 may use the measure of accuracy to compute for itself the region of certainty and the mobile terminal 21 may then send the computed region of certainty to the agent server 25. The agent server 25 may consult a criteria database 29 to determine criteria by which a lottery ticket may be sold. The criteria may include, for example, a jurisdiction in which a lottery ticket may be sold. The agent server may then consult with a map database 27 in which one or more jurisdictions are associated with location coordinates. The agent server 25 may then determine an extent to which the received or computed region of certainty is within the jurisdiction supplied by the criteria database 29 using information retrieved from the map database 27. The agent server 25 may also retrieve player information from a player database 28 and based on the retrieved and computed information, may make a determination as to whether a lottery ticket may be sold. If the agent server 25 determines that a lottery ticket may be sold, the agent server 25 may either issue a lottery ticket for the player or request that a lottery ticket be issued by a lottery administration server 26. The lottery administration server 26 may provide a serial number for an issued lottery ticket back to the agent server 25 and the agent server 25 may store the serial number for the issued ticket in the player database 28 and/or provide the serial number back to the mobile terminal 21 for storage. An issued lottery ticket may include not only the provided serial number, but may also include a set of play numbers. The play numbers may be selected by the user 20 on the mobile terminal 21 or may be randomly generated either by the player's mobile terminal 21, the agent server 25, the lottery administration server 26, or by another entity. A set of winning numbers may then be selected either by the agent server 25, the lottery administration server 26 or by an independently managed number selection server (not shown). The winning numbers may then be matched to the play numbers of the issued lottery ticket, by the lottery administration server 26, the agent server 25 and/or the mobile terminal 21. A prize may then be credited to the player 20 in accordance with a correspondence between the winning numbers and the play numbers and terms of play for the issued lottery ticket. The terms of play may be accessible to the player 20 via the player terminal 21 and may be made available to the player 20 at the time of the lottery ticket purchase.

Figure 3:
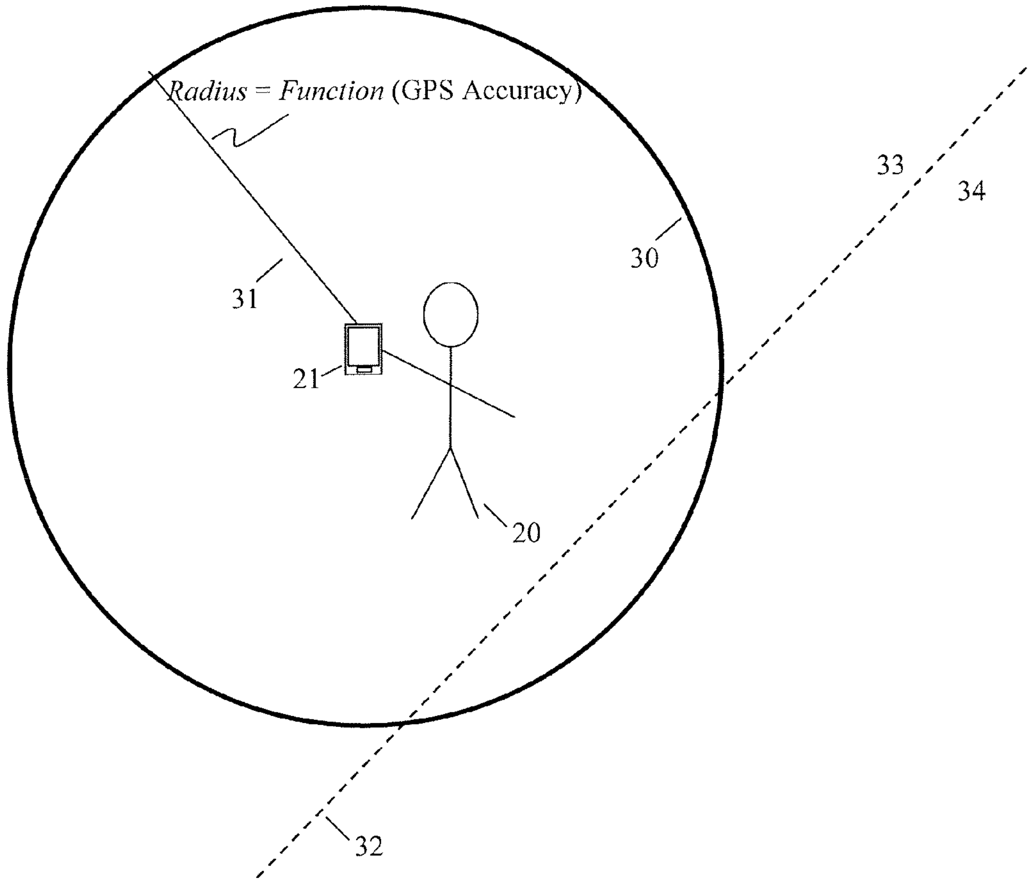
FIG. 3 is a diagram illustrating location verification according to an exemplary embodiment of the present invention.

FIG. 3 is a diagram illustrating location verification according to an exemplary embodiment of the present invention. As described above, the player 20 may be in personal possession of the mobile terminal 21. The mobile terminal may determine location coordinates and a measure of accuracy from a constellation of satellites 22. The mobile terminal 21 may use the location coordinates and the measure of accuracy to calculate a region of certainty 30 about the location of the player 20/mobile terminal 21. The calculated region of certainty 30 may be defined as an area within which the player 20/mobile terminal 21 is located. The region of certainty 30 may be centered about the player 20/mobile terminal 21, may be circular in shape, and may have a radius 31. The radius may be a function of the measure of accuracy; wherein, the greater the measure of accuracy, the smaller the radius 31 of the region of certainty is. For example, as described above, the length of the radius may be proportional to the number of satellite locks used to provide the location coordinates. It may then be determined, by the mobile terminal 21 and/or the agent server 25, an extent to which the region of certainty 30 is within a particular jurisdiction 33 that may be divided from an extra-jurisdictional region 34 by a boundary 32 which may be defined in a map database 27 that may be located at the location of the agent server 25, within the mobile terminal 21, or at some other location.

As described above, location might not be the only criterion used to determine whether a sale of a lottery ticket is allowed. Player age may also be a criterion. Exemplary embodiments of the present invention provide for a system and method for identifying the age of a player and/or verifying the identity of a player whose age is already known.

Figure 4:
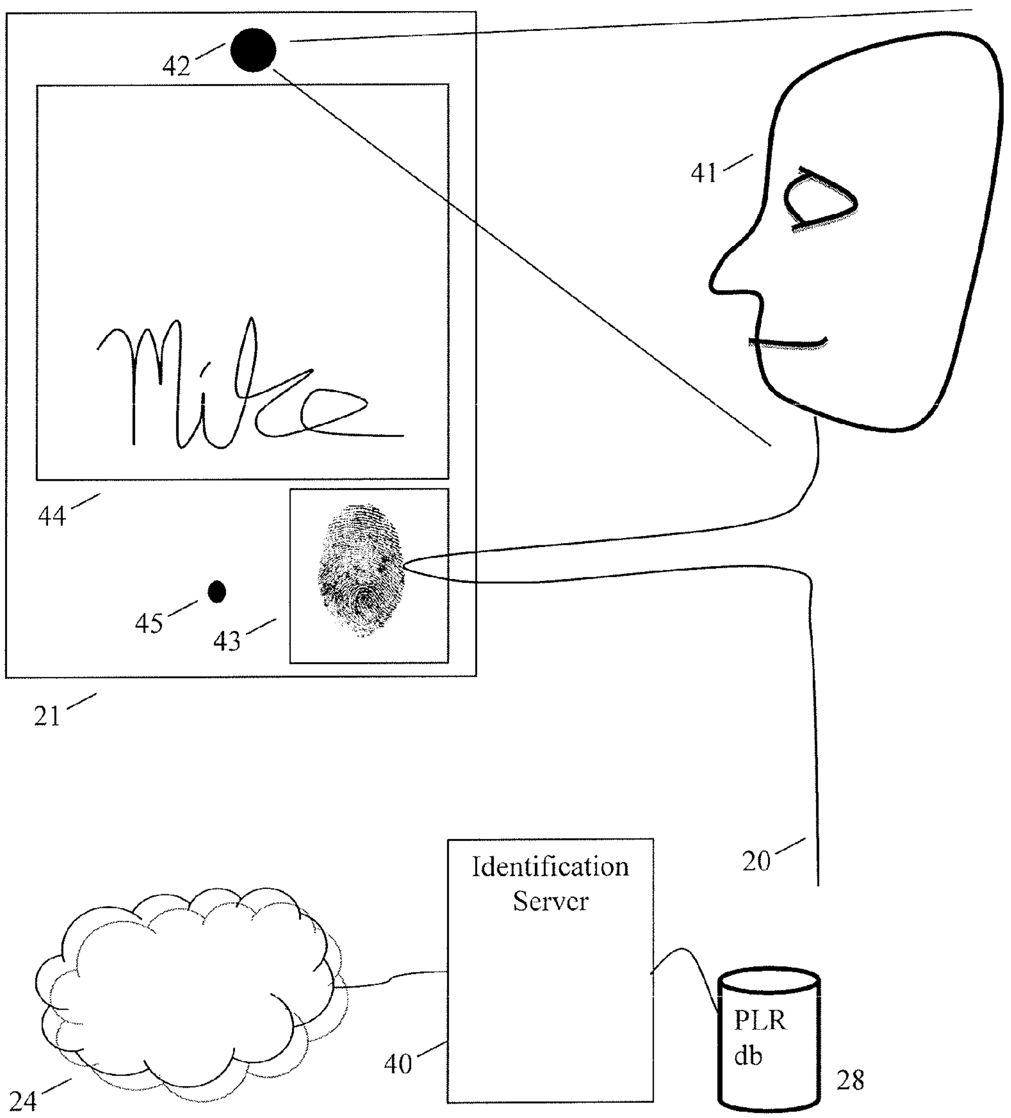
FIG. 4 is a diagram illustrating a system for verifying player age according to an exemplary embodiment of the present invention.

FIG. 4 is a diagram illustrating a system for verifying player age according to an exemplary embodiment of the present invention. As described above, there are two ways in which the player's age may be verified. According to the first approach, the player's age may be pre-verified, for example, at the time of player account generation, and the player's identity may be confirmed at the time of ticket sale. According to the second approach, the player's age may be directly verified, either for the purpose of establishing a new player account or for the purpose of purchasing a lottery ticket without a pre-verified age.

Where age is pre-verified, the player's identity may be verified, for example, by facial recognition. Facial recognition may be performed by acquiring an image of the player's face 41 using a camera module 42 incorporated into the mobile terminal 21. The actual software for performing facial recognition may be local to the mobile terminal 21 or the image of the player's face 41, after being acquired by the mobile terminal 21, may be transmitted via the Internet connection of the mobile terminal 21 to an identification server 40 which may perform facial recognition to verify the identity of the player 20. The player's identify verification may be performed by matching the image of the player's face to one or more pre-stored images of the player's face and/or data pertaining to appearance characteristics. The pre-stored images may be stored in a player database 28.

Alternatively, or additionally, the player's identity may be verified by fingerprint recognition. Fingerprint recognition may be performed by acquiring an impression of a finger of the player using a digital fingerprint scanner 43 incorporated into the mobile terminal 21. The actual software for performing fingerprint recognition may be local to the mobile terminal 21 or the impression of the player's finger may be transmitted via the Internet connection of the mobile terminal 21 to an identification server 40 which may perform fingerprint recognition to verify the identity of the player 20. The player's identity verification may be performed by matching the impression of the player's fingerprint to one or more pre-stored impressions of the player's fingerprint and/or data pertaining to fingerprint characteristics. The pre-stored fingerprint impressions may be stored in the player database 28.

Alternatively, or additionally, the player's identity may be verified by handwriting recognition and/or signature matching. A digitizer 44 may be incorporated into the mobile terminal 21. For example, the digitizer 44 may be a touch screen. The player 20 may then provide a handwriting sample and/or signature by writing on the digitizer with a stylus, capped pen, or some other implement. The actual software for performing handwriting recognition and/or signature matching may be local to the mobile terminal 21 or the digitized sample may be transmitted via the Internet connection of the mobile terminal 21 to an identification server 40 which may perform the handwriting recognition and/or signature matching. The player's identity verification may be performed by matching the handwriting sample and/or signature to one or more pre-stored samples of the player's handwriting/signature and/or data pertaining to handwriting/signature characteristics. The pre-stored samples may be stored in the player database 28.

Alternatively, or additionally, the player's identity may be verified by voice recognition. A microphone 45 may be incorporated into the mobile terminal 21. For example, the microphone 45 may be the microphone of a smartphone. The player 20 may then provide a voice sample by speaking into the microphone, for example, by reading text displayed on the mobile terminal provided for this purpose. The actual software for performing voice may be local to the mobile terminal 21 or the digitized sample of the voice, or a signature thereof, may be transmitted via the Internet connection of the mobile terminal 21 to an identification server 40 which may perform the voice recognition. The player's identity verification may be performed by matching the voice sample, or a signature thereof, to one or more pre-stored samples of the player's voice or signatures thereof. The pre-stored samples or vocal signature may be stored in the player database 28.

The player terminal 21 may also be used to create a player account and to provide the identifying information discussed above for storage in the player database 28. Verification of the player's age, in establishing a player account, may be performed by using the camera module 42 of the player terminal 21 to capture an image of the player's identification card. The verification of the authenticity of the player's identification card and/or the deciphering of the information written thereon may be performed either automatically using software local to the mobile terminal 21 or remotely on an identification server 40 using image matching and optical character recognition (OCR) or by sending the image of the player's identification card to a human operator for manual verification. Where manual verification is used, the operator may activate the player's account upon verification of the authenticity of the identification card and determining that the player is of a suitable age.

According to an exemplary embodiment of the present invention, the age of the player 20 may be determined by analyzing an image of the player's face 41 acquired by the camera module 42 of the mobile terminal using facial age estimation software. Facial age estimation may either be performed locally within the mobile terminal 21 or at the identification server 40 side by sending an image of the player's face over the mobile terminal's Internet connection to the identification server 40. Facial age estimation may be performed automatically using algorithms for identifying and dating facial features or by sending an image of the player's face to a human operator for manual verification. Facial age estimation may be used either as a single means of age verification or may be used in combination with other techniques such as those described above. For example, automatic facial age estimation may be used in conjunction with optical character recognition performed on an image of the player's identification card or document.

Facial age verification may provide either a single estimated age or a likely range of ages. The estimated age or age range may then be compared to the age criterion. The player may be permitted to purchase the lottery ticket when either the estimated age exceeds a predetermined threshold or the estimated range exceeds a predetermined threshold. The predetermined threshold may allow for a margin of error, for example, so that only those players whose age estimation exceeds 40-years may be permitted to purchase the lottery ticket in the absence of manual age verification.

According to an exemplary embodiment of the present invention, the player may be permitted to purchase a lottery ticket prior to age verification but age verification may be required to redeem a prize. In such a case, an image of the player may be captured at the time the ticket was purchased to verify that the player whose age is being verified at the time of redemption is indeed the player who purchased the lottery ticket.

Figure 5:
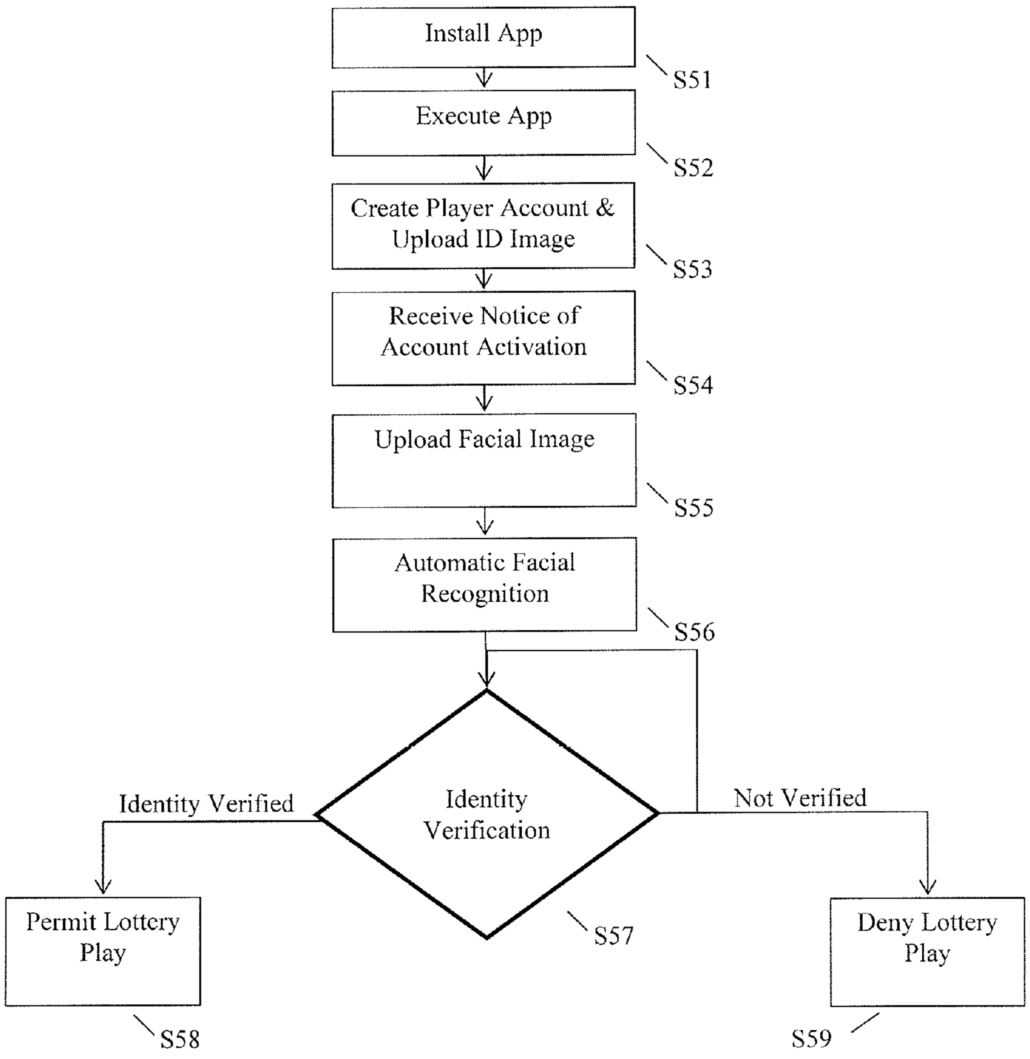
FIG. 5 is a flowchart illustrating a method for age verification according to an exemplary embodiment of the present invention.

FIG. 5 is a flowchart illustrating a method for age verification according to an exemplary embodiment of the present invention. It should be understood that the following method for age verification may be combined with the above-described method for location verification so that both location and age may be verified prior to the sale of a lottery ticket. Moreover, while FIG. 5 shows an example in which age verification is determined at the creation of a player account and identity verification is used at the point of ticket sale, as an alternative to this approach, age verification may be performed automatically at the time of ticket sale, for example, as described in detail above.

First an application may be installed on the mobile terminal (Step S51). The application may be a mobile application for mobile lottery play and may include functionality for signing up for a new player account. The installed application may be executed by the player (Step S52). If the player already has a player account then the method may skip ahead to step S55. If the player does not already have a player account then the player may create a player account using the mobile application (Step S53). As part of the creation of the player account, the player may be requested to furnish an identifying card or document. For example, the player may be asked to hold a valid government-issued driver's license in front of a camera incorporated into the mobile device so that an image of the document may be captured. Where automatic age verification is to be performed, the image of the identifying document may be processed either locally or at a remote server to determine whether the document establishes a sufficient age for lottery play. Alternatively, the ID image may be uploaded by the mobile application to an identification server for review.

Once at the identification server, the player's new account may either be manually or automatically reviewed to establish that the player is of a suitable age for lottery play. If the player's age is so established, the player's account may be activated and the mobile terminal and/or the player may receive a notice of account activation (Step S54). The player may then either proceed to lottery play or may continue with identity verification.

Identity verification may be performed, for example, where some time has passed between age verification and the player's desire to engage in lottery play. In performing identity verification, the player may first use the mobile application to capture an image of the player's face. The image may then be uploaded to an identification server (Step S55) for the remote performance of automatic facial recognition (Step S56) or the mobile application itself may perform automatic facial recognition (Step S56), depending on the computational capabilities of the mobile terminal. Automatic facial recognition may be used to ensure a match between the player and the player's previously uploaded ID image. Alternatively, or additionally, automatic facial recognition may include automatic facial age estimation.

If the player's identity is positively verified (Yes, Step S57), then lottery play may be permitted. If the player's identity is not positively verified (No, Step S57), then lottery play may be denied (Step S59) or identity verification may be repeated.

As discussed above, exemplary embodiments of the present invention may be used to facilitate mobile gaming. Mobile gaming may be a lottery, as described in detail above. However, it is to be understood that exemplary embodiments of the present invention may be applied to other forms of mobile gaming. For example, mobile gaming may include games of chance or skill involving wagering, where wagering is understood to mean the act of paying a sum of money or points for a chance to win another sum of money, points, or property. Examples of other suitable games for which exemplary embodiments of the present invention may be applied include instant win games, keno, sports betting, card games, and the like.

An instant win game is a game in which the player selects either a number or selects among a predetermined set of choices. Some numbers/choices will have already been determined to be winning and then shortly after the player makes a selection, the player will be informed of whether a winning number/choice was selected. An instant win game may differ from a lottery game in that the winning numbers/choices will have been predetermined prior to the player's selection.

Keno is a lottery-type game in which a player selects from among a set of playable numbers and then winning numbers are randomly selected or drawn. In standard lottery, the number of numbers drawn typically is identical to the number of numbers selected by each player and a jackpot is won when all of the numbers selected match the numbers drawn, typically in the same order. Also, in standard lottery, drawings are often held on a weekly basis. However in Keno, there may be multiple drawings per day and the number of numbers drawn need not match the number of numbers selected by the player. The order of selection might also not be significant in keno. Moreover rather than all potential winners splitting prices, as may be done in standard lottery, in keno, the amount won may be determined by the number of numbers successfully matched, without consideration to how many other players may have selected the same set of numbers.

In sports betting, players may select a winning team or athlete or may make some guess as to game scores. The game may then be played and the results of the game may determine whether the player has won or lost the wager. The athletic competition may be an actual athletic competition. A single app may be used to both administer the betting and display the game. For example, a user may run an application from a mobile phone, select from among a set of sporting events that are to be conducted in the near future, place a bet for that game, and then watch that game on the mobile device itself. Upon completion of the game, the player may be informed of whether the wager was won or lost and if it was won, how much money or how many points were won. Where the player has chosen not to watch the entire game to completion, the player may receive a mobile alert, such as a text message, when the game is complete and the player may be accordingly informed of the results.

The player may also use the application to send the game being wagered upon to the player's television set or computer for more convenient viewing. This may be performed using a set-top-box device such as CHROMECAST developed by Google, or APPLE TV developed by Apple Inc. The player may accordingly use the gaming application running on the player's mobile phone to place a bet on an athletic competition and then the player may use the application to display the game on a television using the CHROMECAST device. The player may also use the application to select another sporting event to wager on even while the first sporting event continues to play out and then the player may use the application to display the second sporting event to the same or a different television. Where the second sporting event is displayed on the same television, the first sporting event may be replaced or the television may setup a split screen or picture-in-picture to display multiple sporting events/athletic competitions.

Similarly, when playing a keno game, a real-time broadcast of a keno drawing may be displayed on the user's mobile terminal, for example, smartphone, and the user may use the application to display the real-time broadcast of the keno drawing to the player's television, home computer or tablet computer, as desired, thereby enhancing the keno experience without confining the player to a particular location in which keno drawings are displayed via closed-circuit television or the like.

Exemplary embodiments of the present invention may also be used to facilitate wagering on card games such as poker and blackjack either against computer opponents or against other players using the same mobile application.

As described above, exemplary embodiments of the present invention may be used to play multi jurisdictional lottery in which multiple jurisdictions, for example, states, jointly administer, or otherwise participate, in a lottery drawing in which people in all of the participating jurisdictions are permitted to play. As described above, in general, when a player cannot be precisely located within a single jurisdiction, mobile play will not be allowed. However here, when a player cannot be precisely located within a single jurisdiction, play may still be allowed if the player's region of confidence extends into two or more neighboring jurisdictions that all participate in the multi-jurisdictional lottery game.

Figure 6:
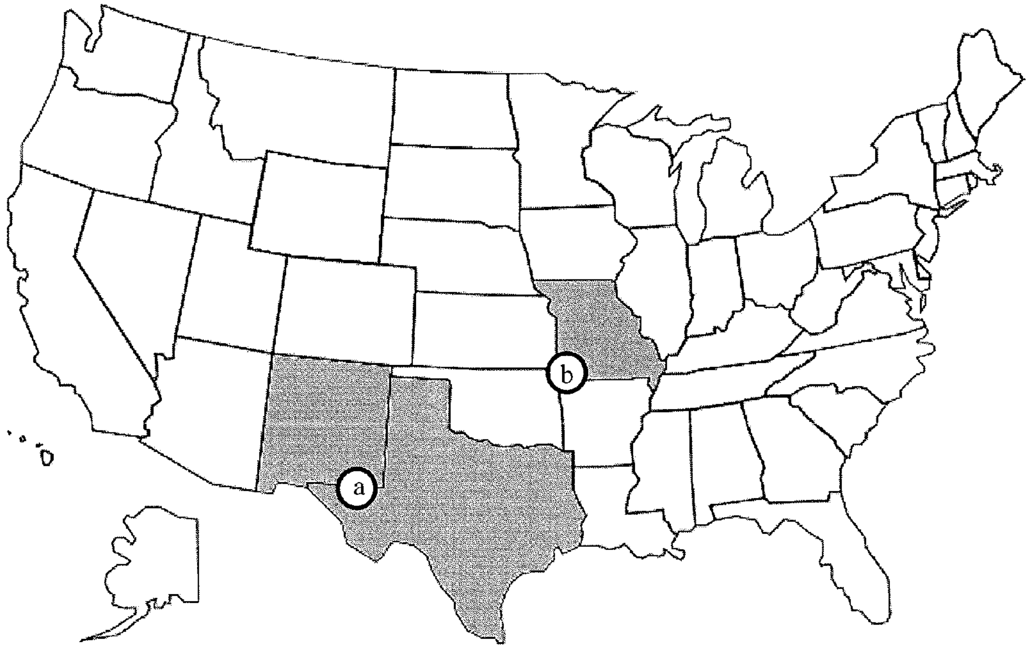
FIG. 6 is a map illustrating an example of jurisdictions that are participating in a multi-jurisdictional lottery play.

FIG. 6 is a map illustrating an example of jurisdictions that are participating in a multi jurisdictional lottery play. In this example, the jurisdictions are states of the United States of America and the states that are colored gray represent participating states. Here Texas, New Mexico and Missouri are shown as being participating jurisdictions. Circle "a" represents a region of confidence that is partially within the state of Texas and partially within the state of New Mexico. Exemplary embodiments of the present invention may permit multi-jurisdictional lottery play in such an instance. Circle "b" represents a region of confidence for another player. This region of confidence is predominantly located within the state of Missouri but also stretches into Kansas, Oklahoma, and Arkansas, which are not participating jurisdictions. Accordingly, exemplary embodiments of the present invention might not permit multi jurisdictional lottery play in such an instance.

Figure 7:
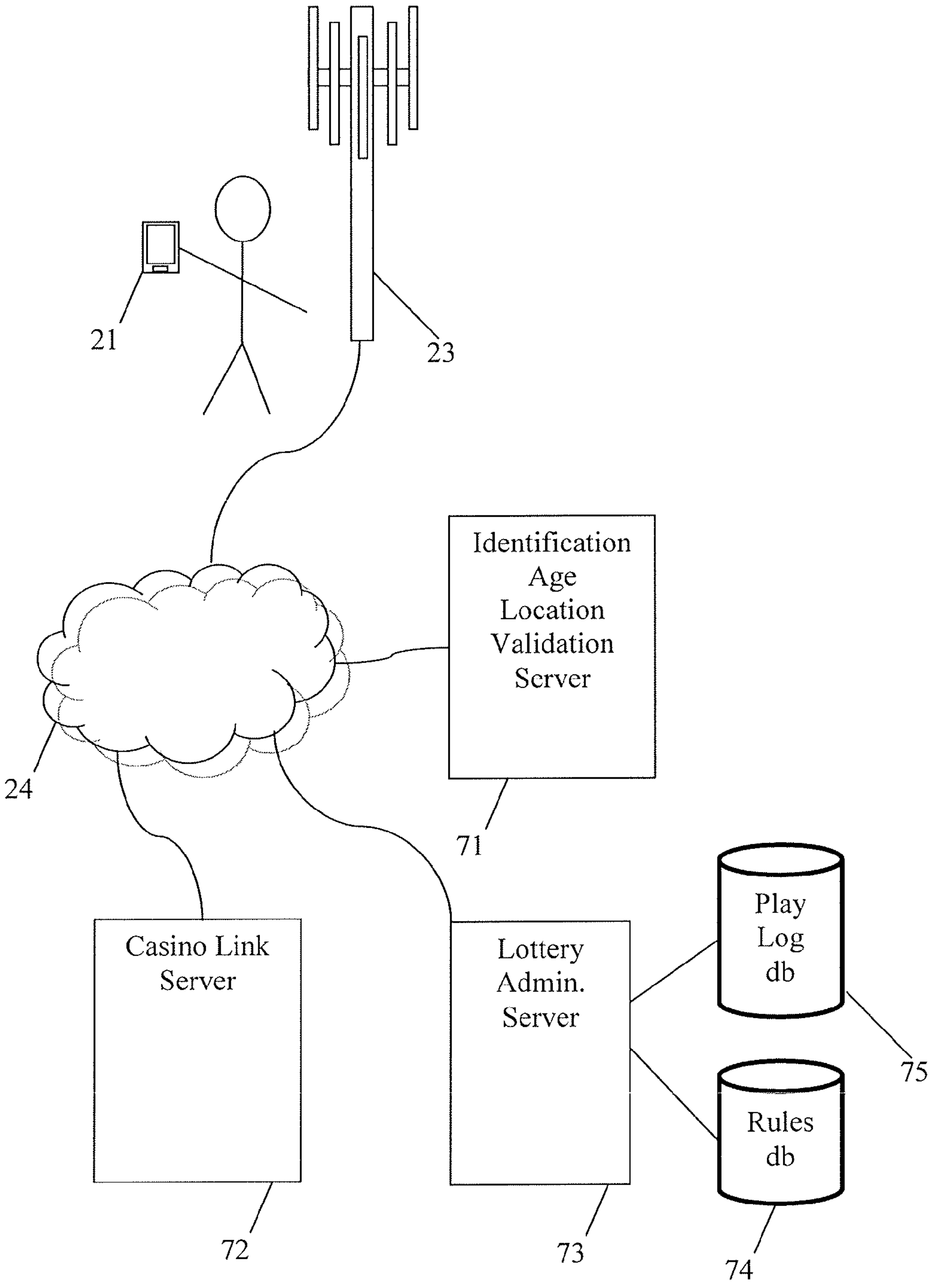
FIG. 7 is a schematic diagram illustrating a system and approach for mobile gaming in accordance with exemplary embodiments of the present invention.

As described above, exemplary embodiments of the present invention may be used to facilitate mobile gaming for many different types of games of chance. These games of chance may be sponsored by a casino located within a jurisdiction permitting casinos such as Nevada, tribal lands, or a card house in California. FIG. 7 is a schematic diagram illustrating a system and approach for mobile gaming in accordance with exemplary embodiments of the present invention. A casino link server 72 may be located within the casino/card house and may permit a remote player to engage in games played within the casino. For example, an electronic game or electronically-assisted game located within a casino may permit local and/or remote players to participate in a game of chance. The casino link server 72 may manage remote play sessions by interfacing with one or more electronic or electronically-assisted games located within the casino. The player may use a mobile device 21 as a player terminal in communication with a base station 23 to interface with the casino link server 72 over a computer network 24 such as the Internet. The Casino link server 72 may rely upon an identification/age/location validation server 71 to ensure that the player is legally permitted to participate in the games of chance/wagering. The identification/age/location validation server 71 may authenticate the identification, age, and/or location of the player terminal 21, for example, using one or more of the techniques described above. The identification/age/location validation server 71 may also interface with a lottery administration server 73 to determine who is eligible to play what games. The lottery administration server 73 may consult with a rules database 74 to determine game play requirements. The lottery administration server 73 may also maintain a log of who plays what games within a play log database 75. The lottery administration server 73 may operate under the authority of a state lottery or gaming commission.

Figure 8:
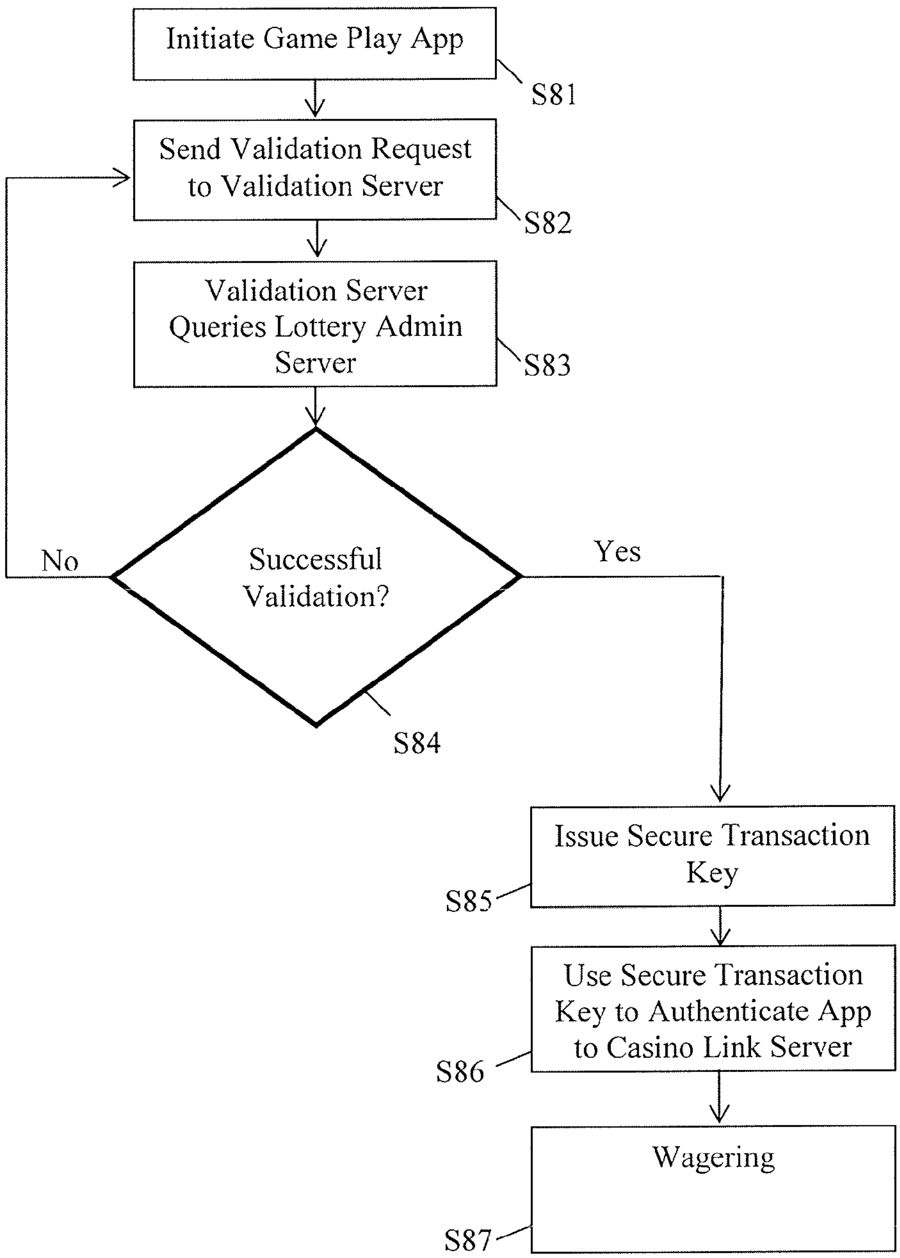
FIG. 8 is a flow chart illustrating an approach for facilitating mobile gaming using the system illustrated in FIG. 7 and described above.

FIG. 8 is a flow chart illustrating an approach for facilitating mobile gaming using the system illustrated in FIG. 7 and described above. First, a player may use a smartphone to initiate an application for mobile game play (Step S81). The application may then generate a validation request and send the generated request to the validation server (Step S82). The validation server may identify the instance of the application, for example, from a unique identification number associated with the player's smartphone. This unique identification number may be a UDIC, a MAC address, an IP address or some other identifying number or string. The validation server may associate the unique identification number and/or a user's login credentials and may use this information to recall information associated with the user that may be used to determine whether the user is qualified to participate in the mobile gaming. The validation server may also verify the present location of the user's smartphone in accordance with the techniques discussed above. The validation server may then query the lottery administration server (Step S83). The query may include the player's verified age and location and may additionally include other pertinent information such as the player's name, address, etc.

The lottery administration server may be a server maintained by the state lottery or on its behalf. The lottery administration server may verify that the user satisfies the requirements for mobile gaming such as age and location (Step S84). However, the requirements for participation in mobile gaming may extend beyond verification of age and location. For example, the player's name may be checked against a blacklist of accounts known or suspected to have been used by people other than the registered player or known to be associated with problem gamblers. Additionally, one or more security algorithms may be used to determine whether something about the validation request seems suspicious such as game play from a time and/or place that is unusual for that particular player account. Thus the query to the lottery administration server may be used not only to verify player age and location, but may also be used to reduce risk of fraud and to serve other public policy objectives of the state lottery administration, such as ensuring responsible game playing.

The lottery administration server may also log the circumstances of the player's participation in mobile gaming and this logging may be used to help train security algorithms and to run queries by the lottery administration to determine player habits more generally.

If the lottery administration server successfully validates the validation server's query (Yes, Step S84) then the lottery administration server may issue a secure transaction key (Step S85). The secure transaction key may be a number or other identifier that sanctions the player's gaming session with the casino link server. The secure transaction key may be encrypted and not amenable to reverse engineering. The secure transaction key may include limitations such as a maximum number of games that may be played, a maximum dollar value permitted to be wagered, or any other restriction. These restrictions may only be deciphered by the casino link serer. The session associated with the secure transaction key may be finite in time and may expire after a particular period of time and/or a particular period of non-use.

If validation is not successful (No, Step S84), then the player may be provided with dialogue explaining the failure and providing the player another opportunity to correct any errors in the validation request.

Upon being issued the secure transaction key from the lottery administration server, the validation server may present the secure transaction key to the Casino Link Server to authenticate the game play application/user to the casino link server (Step S86). The casino link server may thereafter decipher the restrictions associated with the secure transaction key and permit game play within one or more casino game play servers in accordance with the restrictions (Step S87).

Figure 9:
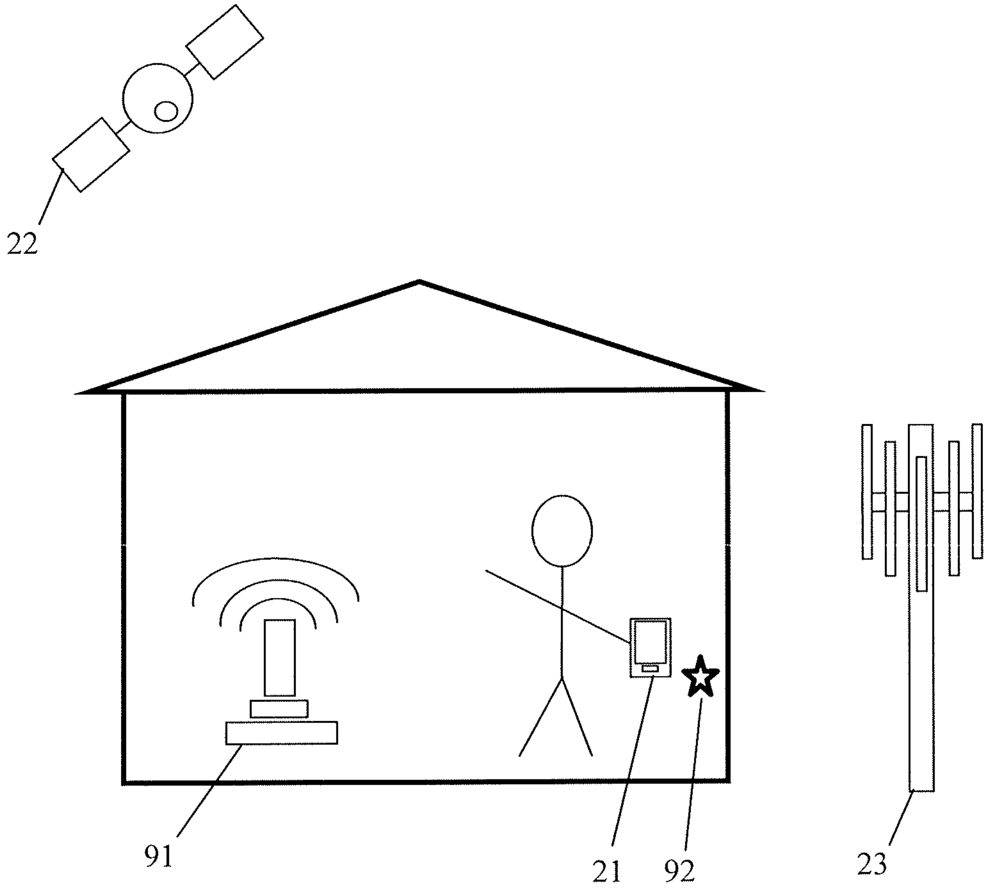
FIG. 9 is a schematic diagram illustrating some approaches for pinpointing player location in accordance with exemplary embodiments of the present invention.

As discussed above, exemplary embodiments of the present invention may utilize other technologies to pinpoint the location of the player in addition to or instead of GPS. FIG. 9 is a schematic diagram illustrating some approaches for pinpointing player location in accordance with exemplary embodiments of the present invention. As shown in the figure, the player's mobile terminal 21 may use a radio-frequency identification (RFID) unit to identify itself to a location point device 92 and/or to identify the particular location point device 92. The location point device 92 may be stationary with a known location within a particular jurisdiction and therefore, the mobile terminal's 21 identification of the particular location point device 92 and/or the particular location point device's 92 identification of the mobile terminal 21 may be used to authenticate the player's position. However, as RFID tags may be copied, exemplary embodiments of the present invention may require that the mobile terminal 21 identifies the location point device 92 and the location point device 92 identifies the mobile terminal 21, with each device sending the identification information to the validation server so that location may be identified and verified.

The location point device 92 need not be limited to the use of RFID, it may use near-field communication (NFC), optically recognized quick response (QR) codes, or the like. According to one exemplary embodiment of the present invention, an indoor proximity system such as IBEACON, marketed by Apple Inc. may be used to broadcast a signal from a signaling device 91, for example using BLUETOOTH low energy (BLE). The mobile terminal 21 may receive the signal from the signaling device 91 and the mobile gaming application may relay the received signal back to the validation server, which may identify the signaling device 91 and ascertain the precise location of the mobile terminal. This precise location may be within a particular room in a particular building.

According to one exemplary embodiment of the present invention, location may be precisely identified using all available forms of locating technologies. A location score may be assigned to the mobile terminal 21 based on each of the available location technologies and mobile game play may be permitted when a particular score threshold is met. For example, a GPS 22 may be used to provide a first number of points. The more accurate the GPS lock is the more points are awarded. Location may be identified based on the known location of the mobile terminal 23 that the mobile device 21 is in communication with. The mobile terminal 23 may be used to provide a second number of points. Similarly, an RDIF location point device 92 may be used to provide a third number of points and a BLE signaling device 91 may be used to provide a fourth number of points. The user may then be assigned a location score based on each of these sets of provided points, for example, by summing up all the points or finding an average number of points from among all sources. Another formula may be used to create the location score from the sets of provided points. However, in this way, exemplary embodiments of the present invention may determine a final location score that may be used to determine if a mobile terminal 21, and hence a player, is located within a particular jurisdiction.

Figure 10:
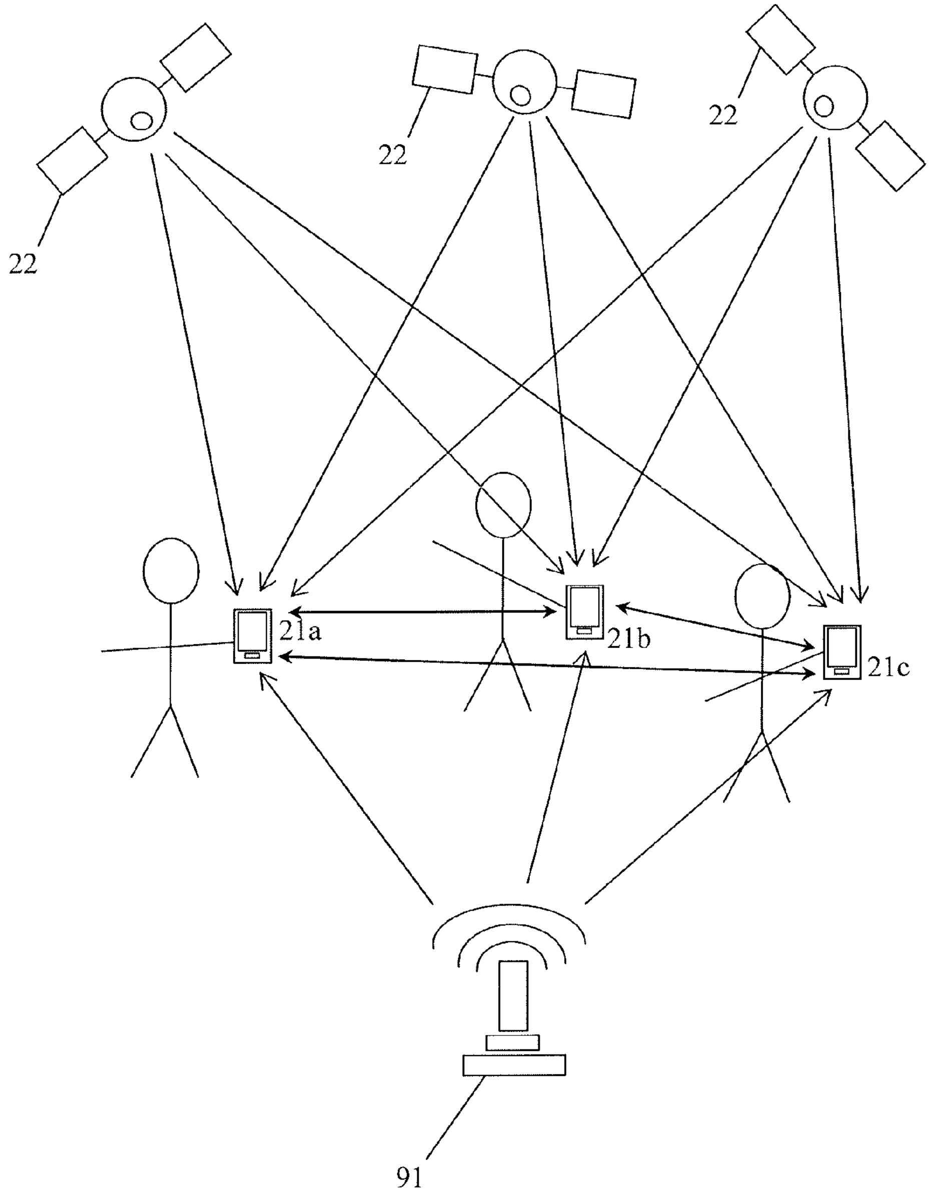
FIG. 10 is a schematic diagram illustrating an approach for location determination of a mobile terminal in close proximity to other mobile terminals in accordance with exemplary embodiments of the present invention.

According to exemplary embodiments of the present invention, where there are multiple mobile terminals 21 within close proximity of each other, the location of each player relative to each other may be used to support a finding of location for each of the players. FIG. 10 is a schematic diagram illustrating an approach for location determination of a mobile terminal in close proximity to other mobile terminals in accordance with exemplary embodiments of the present invention. This approach operate under a principal that mobile terminals 21 independently found to be within close proximity of each other should be able to recognize signals sent by one another. Each mobile terminal may be able to identify each other either by WiFi signals or by BLUETOOTH signals such as BLE. This peer-to-peer location determination may be used either to corroborate mobile terminal location, where other means of location are available, or to locate a terminal that is not otherwise locatable.

For example, where a first mobile terminal 21*a* is located at a particular location based on either GPS 22 or a BLE signaling device 91, where a second mobile terminal 21*b* is located at a substantially identical location based on either GPS 22 or a BLE signaling device 91, and where a third mobile terminal 21*c* is located at a substantially identical location based on either GPS 22 or a BLE signaling device 91, exemplary embodiments of the present invention may attempt to initiate a peer-to-peer communication between one or more of the mobile terminals 21 so that the location information may be corroborated. If one of the mobile terminals cannot identify the other mobile terminals, and/or be identified by the other mobile terminals then the location of that mobile terminal may be characterized as indeterminate, even if, for example, that mobile terminal has a strong GPS lock identifying its location.

As the possibility exists that manipulation of the mobile terminal 21 may be used to provide the game play application with a falsified or spoofed GPS position, determining whether multiple mobile terminals that are supposed to be in substantially the same location can sense each other may provide a level of added assurance that the location of the mobile terminal is legitimate. This approach may be particularly useful in densely populated areas where multiple people running the same or compatible game play app may be congregating.

Alternatively, a precise location of all mobile terminals 21 relative to each other, as determined by the peer-to-peer signaling, may be used to formulate a good understanding of the location of each mobile terminal, even in areas where GPS-based location is unavailable, for example, owing to nearby mountain ranges or prevalence of tall buildings.

Additionally, peer-to-peer signaling may be used to triangulate the location of one mobile terminal 21 based on the known location of at least two other mobile terminals whose location has been established by other means, such as by GPS 22 and/or a BLE signaling device 91.

As shown in the figure, the location of mobile terminal 21*a* may be established by each GPS satellite 22, by proximity to a BLE signaling device 91, and by proximity to mobile terminals 21*b* and 21*c*. The location of mobile terminal 21*b* may be established by each GPS satellite 22, by proximity to a BLE signaling device 91, and by proximity to mobile terminals 21*a* and 21*c*. The location of mobile terminal 21*c* may be established by each GPS satellite 22, by proximity to a BLE signaling device 91, and by proximity to mobile terminals 21*a* and 21*b*. As described above, proximity among the mobile terminals may be measured by peer-to-peer WiFi or BLE signaling. According to one exemplary embodiment pf the present invention, location may be determined for one or more mobile terminals that are connected together as a WiFi mesh network.

As discussed above, exemplary embodiments of the present invention may be applied to online/mobile lottery play as well as to other forms of mobile gaming. As understood herein, lottery play may include a game of change in which a user selects a set of numbers. The number of numbers selected or the ranges of numbers that may be selected may vary, however, as an example, the player may be asked to select 8 numbers from 1 to 10. The player may alternatively have numbers selected randomly, which may be referred to as "quick pick." A periodic drawing may then be held, for example, once a week. The drawing may randomly select winning numbers and a player may win a prize whose value may increase as more numbers are matched in their correct order. Matching all numbers in the correct order may be referred to as a jackpot and prizes at least level may be divided among all winning lottery tickets.

However, lottery play is not limited to the game described above. Lottery play may include instant win games and keno games, as previously described. Additionally, lottery games may include any game in which a player chooses a number or other classification and the results are randomly determined or where results are randomly determined for each game in advance and the player, upon playing the game, is either randomly assigned a game or receives the next game in sequence.

Lottery play, in accordance with exemplary embodiments of the present invention, might not appear as a random selection of numbers. Lottery games may be themed to resemble card games, athletic competitions, horse races, and other forms of games, where the outcome is predetermined. The player may also be shown a demonstration or may be permitted to interact with the game play, even while the final outcome is predetermined. For example, the player may be shown a simulated horse race in which the winner has already been predetermined or the player may participate in a black jack style game in which the outcome is predetermined. The player may even be able to choose the style of game and manner of play, even while these choices have not impact on the outcome.

Figure 11:
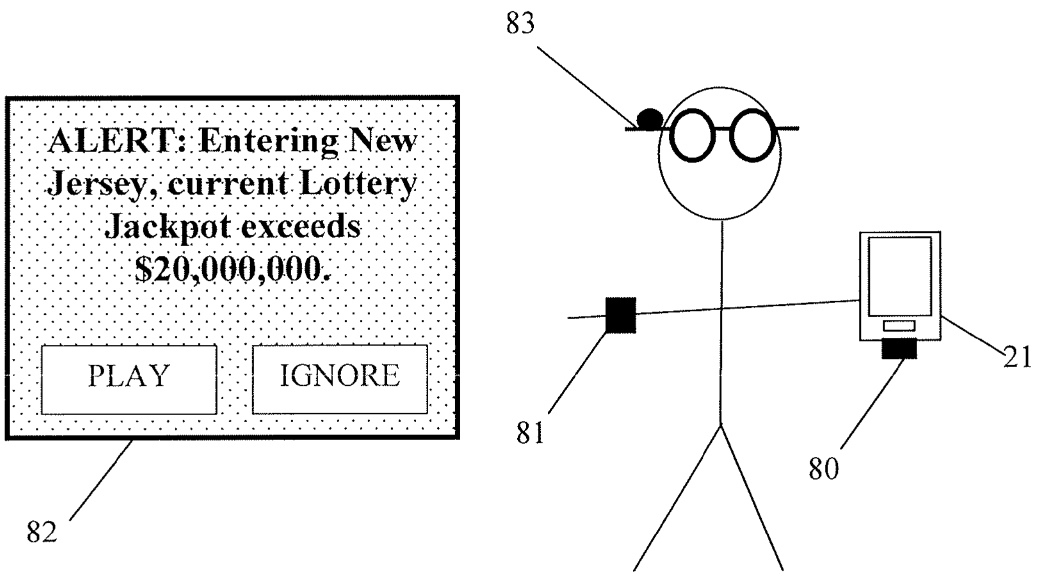
FIG. 11 is a schematic diagram illustrating the use of peripheral and connected smart devices for mobile lottery play in accordance with exemplary embodiments of the present invention.

In addition to the use of the player's smartphone, exemplary embodiments of the present invention may utilize one or more peripheral devices connected to the player's smartphone to aid in verifying the player's identify, age and/or location. FIG. 11 is a schematic diagram illustrating the use of peripheral and connected smart devices for mobile lottery play in accordance with exemplary embodiments of the present invention.

In accordance with exemplary embodiments of the present invention, each player may apply for an receive an authentication device 80, which may connect to the player's smartphone either by wired connection such as micro-USB or proprietary connector such as LIGHTNING, marketed by Apple Inc. This external device may supply to the smartphone various identification numbers which may be recognized by the validation server. These numbers may change sequentially or may be based on a current time, but in either case, the presence of the correct number as supplied by the authentication device may be used to confirm the identity of the player. All games played with that authentication device may be linked to the player's personal account and all winnings from games player with that authentication device pay be payable only to the account of the particular player who was assigned the authentication device. The authentication device may also be deactivated or revoked if need be.

An example of an authentication device that may be connected to the player's smartphone is a fingerprint reading sensor which may be used to verify the identity of the player by fingerprints.

While the authentication device may be connected to the player's smart phone, it may also include a display area for providing the identification numbers discussed above for manual entry by the player.

Moreover, the external device may include any of the above-described radios and sensors, for example, GPS, BLE, WiFi, NFC, etc.

The mobile terminal need not be limited to a smartphone. Exemplary embodiments of the present invention may utilize combined devices as mobile terminals. These combined devices may include a smartphone as well as one or more auxiliary devices which may be wearable computers. The auxiliary devices may, for example, facilitate player interaction with the game play application or may help to provide biometric data which may be used to help authenticate the player's identity. FIG. 8 is a schematic diagram illustrating auxiliary devices in accordance with exemplary embodiments of the present invention.

A smartphone 21 may be part of the mobile terminal; however, other forms of mobile computers may be used instead. The smartphone may be in communication with a smartwatch/fitness band 81 such as the PEBBLE developed by Pebble Technology Corporation or NIKE+FUELBAND manufactured by Nike Inc. and/or a head-mounted system 83 such as GOOGLE GLASS developed by Google Inc. The smartphone 21 may execute the game play application as discussed above, but may receive biometric data from the smartwatch/fitness band 81 for authentication. The smartphone 21 may also convey user interface (UI) elements from the game play application to the smartwatch/fitness band 81 or the head-mounted system 83 so that the player may more easily purchase game play and/or be informed of play results from one of these wearables.

While in an automobile, the smartphone 21 may interface with a vehicle in-dash system 82 such as CARPLAY developed by Apple Inc. or Android Auto developed by Google Inc. The connection between the in-dash system 82 and the smartphone 21 may be made, for example, by BLUETOOTH or wired connection and may be used to convey UI elements to the player in a safe and responsible manner. The player may thereby be able to purchase game play through an automobile and stay informed of the outcome of games that have been previously purchased. Moreover, the connection to the in-dash system 82 may be used to assist in geographic location verification as it may be assumed that when connected to the in-dash system 82, the player is located on a roadway, which may contribute to the localizing of the player, as the player may be assumed to be within a roadway that is within the region of confidence. As a player traveling in an automobile may quickly and easily cross jurisdictional boundaries, exemplary embodiments of the present invention may offer, to the player, an opportunity to purchase a lottery ticket or engage in another form of mobile game play upon entering the new jurisdiction. For example, the in-dash system 82 may provide an alert informing the player that a jurisdiction with available mobile gaming has been entered. The alert may also inform the player of potential jackpot amounts and games available for play. The in-dash system 82 may also contribute to turn-by-turn directions offered by the in-dash system 82 by informing the player how to best alter a rout to enter a particular jurisdiction where mobile gaming may then be played. For example, the player may make preferences known in advance to be informed of an opportunity to alter a driving rout to enter a particular jurisdiction and purchase a lottery ticket when a jackpot exceeds a preselected level. The player may similarly make a preference known in advance to be informed when entering a jurisdiction in which mobile gaming is available and a jackpot exceeds a preselected level.

By interfacing with an in-dash system 82, exemplary embodiments of the present invention may facilitate the purchase of lottery tickets or other mobile gaming while traveling through various jurisdictions. These exemplary embodiments may be performed substantially similarly without the in-dash system 82; however, the use of the in-dash system 82 may facilitate the purchasing lottery tickets and other forms of mobile gaming from an automobile.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for mobile game play, comprising:

initiating a game play application on a mobile device;

receiving a validation request from the game play application at a validation server, the validation request including player login credentials;

sending a query, in response to the receiving of the validation request, from the validation server to an administration server to determine game play eligibility of the player, the query including an age and present location of the player;

receiving, from the administration server, a secure transaction key authorizing the player to initiate a mobile gaming session when the players age and present location satisfies predetermined criteria;

sending the received secure transaction key to a casino link server; and initiating mobile game play of a casino game through the mobile device via the casino link server upon receiving the secure transaction key, wherein the casino link server is located within a first jurisdiction that permits casino operation, the present location of the player is within a second jurisdiction that does not permit casino operation but does permit lottery play, and the validation server is maintained by a governmental agency of the second jurisdiction.

2. The method of claim 1, wherein the secure transaction key includes one or more restrictions on mobile game play and the casino link server enforces the one or more restrictions.

3. The method of claim 1, wherein. the query sent from the validation server to the administration server further includes a name of the player, and the administration server maintains a database of who has been authorized to participate in mobile gaming.

4. The method of claim 1, wherein the administration server maintains a blacklist of players who are not eligible to engage in mobile gaming and the secure transaction key is only issued for players not on the blacklist.

5. The method of claim 1, wherein player account information is maintained by the validation server.

6. The method of claim 1, wherein the mobile device is a smartphone.

7. The method of claim 1, wherein the administration server is maintained by a governmental agency.

8. The method of claim 1, wherein the mobile game play of the casino game includes the player participating in the casino game in which one or more local participants concurrent participate in, the one or more local participants being located within a casino in which the casino link server is disposed.

9. The method of claim 8, wherein the casino game is a card game.

10. The method of claim 9, wherein the card game is blackjack or poker.

* * * * *